US012292254B2

(12) United States Patent
Prodzenko (10) Patent No.: US 12,292,254 B2
(45) Date of Patent: *May 6, 2025

(54) VIRTUAL REALITY BATON TRAINING DEVICE

(71) Applicant: Street Smarts VR, Inc., New York, NY (US)

(72) Inventor: Greg Prodzenko, Philadelphia, PA (US)

(73) Assignee: Street Smarts VR, Inc., New York, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/685,153

(22) Filed: Mar. 2, 2022

(65) Prior Publication Data

US 2023/0280125 A1 Sep. 7, 2023

(51) Int. Cl.
| | |
|---|---|
| *F41B 15/02* | (2006.01) |
| *A63H 33/00* | (2006.01) |
| *G06F 3/01* | (2006.01) |
| *G06F 3/0346* | (2013.01) |

(Continued)

(52) U.S. Cl.
CPC ............ *F41B 15/02* (2013.01); *A63H 33/009* (2013.01); *G06F 3/011* (2013.01); *G06F 3/0346* (2013.01); *G09B 19/00* (2013.01); *G06F 3/0383* (2013.01); *G06F 2203/0384* (2013.01)

(58) Field of Classification Search
CPC ......... F41B 15/02; G09B 9/003; A63H 33/009
See application file for complete search history.

(56) References Cited

U.S. PATENT DOCUMENTS

| | | | |
|---|---|---|---|
| 8,690,575 B1 | 4/2014 | Gurule et al. | |
| 8,771,085 B1 * | 7/2014 | Clyde | ................... G06F 1/1696 |
| | | | 463/47.4 |

(Continued)

FOREIGN PATENT DOCUMENTS

| | | |
|---|---|---|
| KR | 20190070423 A | 6/2019 |
| KR | 20220014683 A | 2/2022 |

OTHER PUBLICATIONS

PCT/US20/42170, International Search Report and The Written Opinion of the International Searching Authority, Oct. 29, 2020, International Searching Authority.

(Continued)

*Primary Examiner* — Eugene L Kim
*Assistant Examiner* — Alyssa M Hylinksi
(74) *Attorney, Agent, or Firm* — DLA PIPER LLP (US); Blake W. Jackson (57) ABSTRACT

A virtual reality weapon accessory comprising a baton and a tracker adapter coupled to the baton wherein the tracker adapter is configured to adapt with a virtual reality tracker that facilitates communications between the baton and a virtual reality computing device. The tracker adapter includes a groove comprising a female socket configured to receive a strike plate of the virtual reality tracker wherein the groove includes a magnet that attracts to the strike plate. The tracker adapter further includes a pin pad configured to establish signal connections with the virtual reality tracker to transmit signals from the baton to the tracker. The tracker adapter may be configured to detect a flick motion associated with the baton.

13 Claims, 7 Drawing Sheets

(51) Int. Cl.
*G09B 19/00* (2006.01)
*G06F 3/038* (2013.01)

(56) References Cited

U.S. PATENT DOCUMENTS

| | | | |
|---|---|---|---|
| 8,920,172 B1* | 12/2014 | Wilmink | G09B 9/003 |
| | | | 434/19 |
| 9,367,490 B2* | 6/2016 | Huang | G06F 13/4081 |
| 9,414,784 B1* | 8/2016 | Berme | A61B 5/01 |
| 10,682,572 B2* | 6/2020 | Wilson | A63F 13/42 |
| 11,852,436 B2* | 12/2023 | Prodzenko | F41G 3/26 |
| 2006/0105299 A1 | 5/2006 | Ferris et al. | |
| 2007/0146367 A1 | 6/2007 | Harvey, Jr. | |
| 2007/0259594 A1* | 11/2007 | Galbiati | A63H 5/00 |
| | | | 446/15 |
| 2008/0127538 A1 | 6/2008 | Barrett et al. | |
| 2008/0220693 A1* | 9/2008 | Cuisinier | A63H 33/009 |
| | | | 463/43 |
| 2009/0149255 A1 | 6/2009 | Fu | |
| 2010/0035441 A1* | 2/2010 | Rohrbach | H01R 13/24 |
| | | | 439/39 |
| 2012/0026174 A1 | 2/2012 | McKeon et al. | |
| 2014/0065577 A1 | 3/2014 | Quinlan et al. | |
| 2015/0260474 A1 | 9/2015 | Rublowsky et al. | |
| 2017/0307333 A1 | 10/2017 | Northrup et al. | |
| 2017/0343319 A1* | 11/2017 | Galli | F41G 1/35 |
| 2019/0015739 A1* | 1/2019 | May | A63F 13/211 |
| 2019/0057176 A1 | 2/2019 | McBeth | |
| 2019/0213901 A1 | 7/2019 | Kur et al. | |
| 2020/0408480 A1 | 12/2020 | Kur et al. | |
| 2021/0018292 A1* | 1/2021 | Formwalt | F41A 9/61 |
| 2021/0197078 A1 | 7/2021 | Yildiz et al. | |
| 2023/0061207 A1 | 3/2023 | Prodzenko | |

OTHER PUBLICATIONS

PCT/US21/22601, International Search Report and The Written Opinion of the International Searching Authority, Aug. 16, 2021, International Searching Authority.

PCT International Search Report and Written Opinion for International Application No. PCT/US23/62401, Jun. 15, 2023, 6 pages.

"Modular HTC Vive Tracker Mount Set" (Menithal), Dec. 22, 2022 (Dec. 22, 2022), [online], retrieved from <URL:https://www.thingiverse.com/thing:4061587>, entire document.

* cited by examiner

VIRTUAL REALITY BATON TRAINING DEVICE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to training law enforcement personnel and in particular, a mock baton for use in virtual reality training exercises for law enforcement personnel.

Description of the Related Art

One aspects of training law enforcement personnel is the proper handling and use of club weapons, such as batons and the like. Law enforcement personnel carry batons as an additional non-lethal option. It is important that law enforcement personnel be able to maneuver and handle the baton in a safe, but effective manner. While the use of actual batons in training is an option, the use of actual batons for training exercises is not desirable because such batons may be damaged if hit against another baton and use of actual weapons substantially increases the risk of injury to trainees. As such, the use of actual batons during training can be costly in both equipment loss and personnel lost time due to accidents.

Another disadvantage of the use of batons for training is the short life of training batons. Often, repeated use may increase wear on the baton and shorten its service life. Even if the baton does not break, a weakened baton may not be suitable for use. Virtual reality can be used to train the use of a baton. However, existing virtual reality systems supporting batons and the like are limited and require holding of the baton by the trainee for the entirety of a session. Such a limitation affects immersion and, by extension, training effectiveness.

There is thus a need to provide improved baton hardware for virtual reality training.

SUMMARY OF THE INVENTION

The present invention provides a virtual reality weapon accessory comprising a training baton and a tracker adapter coupled to the training baton wherein the tracker adapter is configured to connect the training baton to a virtual reality tracker that facilitates communications between the baton and a virtual reality computing device. The tracker adapter includes a groove comprising a female socket configured to receive the strike plate of the virtual reality tracker wherein the groove includes a magnet that attracts to the strike plate. In one embodiment, the tracker adapter may further include a pin pad which may be used to establish signal connections with the virtual reality tracker in order to transmit signals from the baton to the tracker.

The baton may comprise a weapon portion of the weapon accessory that may have a realistic feel, grip, and weight of an actual baton. The baton may be constructed from plastic, metal, or wood. The groove may provide proper alignment and contact for receiving the virtual reality tracker. The virtual reality weapon accessory may further comprise a scabbard that sheathes at least the tracker adapter and a portion of the baton. The strike plate may comprise a ferromagnetic material. The baton may comprise a center shaft enclosed by a rubber grip. The tracker adapter may include a stem that is attached to a cavity of the center shaft.

The baton may comprise an accelerometer that is coupled to the tracker adapter. The tracker adapter may generate signals that are associated with usage of the baton or a detachment of the baton and the tracker adapter from the virtual reality tracker. The virtual reality tracker may be configured to detect a flick motion associated with the baton. The virtual reality computing device may be configured to render a virtual environment that shows an extended baton corresponding to the flick motion.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a device that mimics the physical characteristics of a real-world baton while integrating the device with a virtual reality system. The present application further discloses systems, devices, and methods that employ virtual reality to train police officers or military in the use of batons in specific scenarios or situations. A trainee may be given a training device that simulates an actual weapon and is connected to a virtual reality system. The trainee may wear goggles or headsets that are connected to the virtual reality system which plays a training scenario. Throughout the training scenario, the trainee's use of his weapon(s) may be tracked and provided to the virtual reality system. In one embodiment, the training device may comprise a tracker including a magnetic mount for mounting to a weapon accessory (e.g., a baton).

Figure 1:
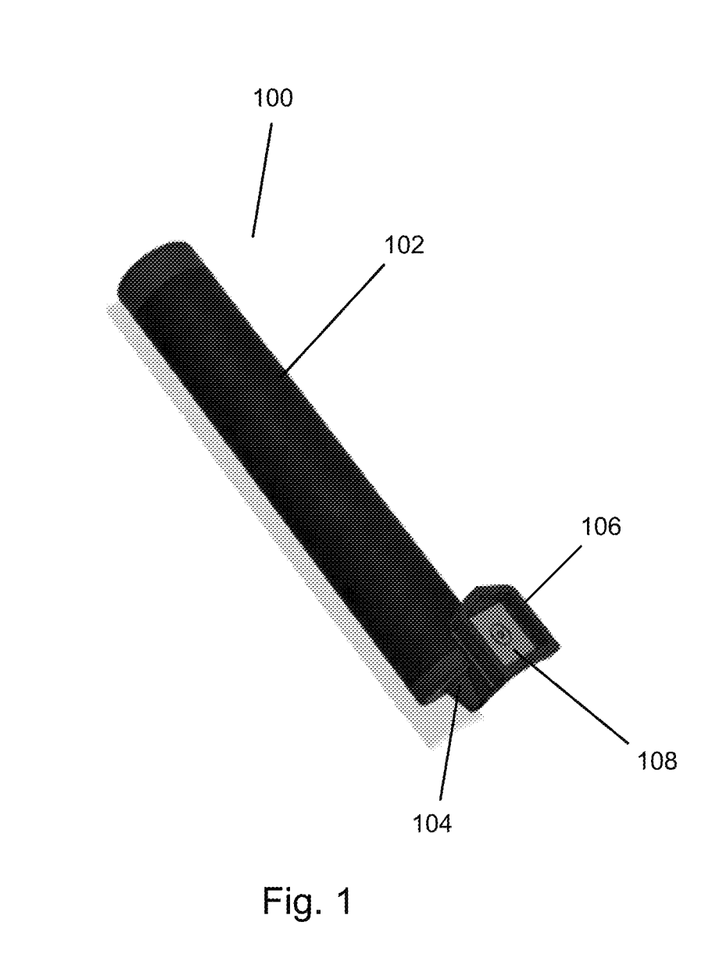
FIG. 1 illustrates a weapon accessory according to an embodiment of the present invention.

FIG. 1 presents a weapon accessory according to an embodiment of the present invention. The presented weapon accessory 100 comprises a baton 102 and a tracker adapter 104. The baton 102 comprises a physical replica weapon portion of the weapon accessory 100. The physical replica weapon portion may be constructed from plastic, metal, wood, or any other suitable material that provides a realistic feel, grip, and weight of an actual baton. Tracker adapter 104 includes a groove 106 and a magnet 108 for coupling with a virtual reality tracker. Groove 106 may provide proper alignment and contact for receiving an attachment component of the virtual reality tracker. According to one embodiment, tracker adapter 104 may be attached to the virtual reality tracker to facilitate communications between weapon accessory 100 and a virtual reality computing device, wirelessly.

Figure 2:
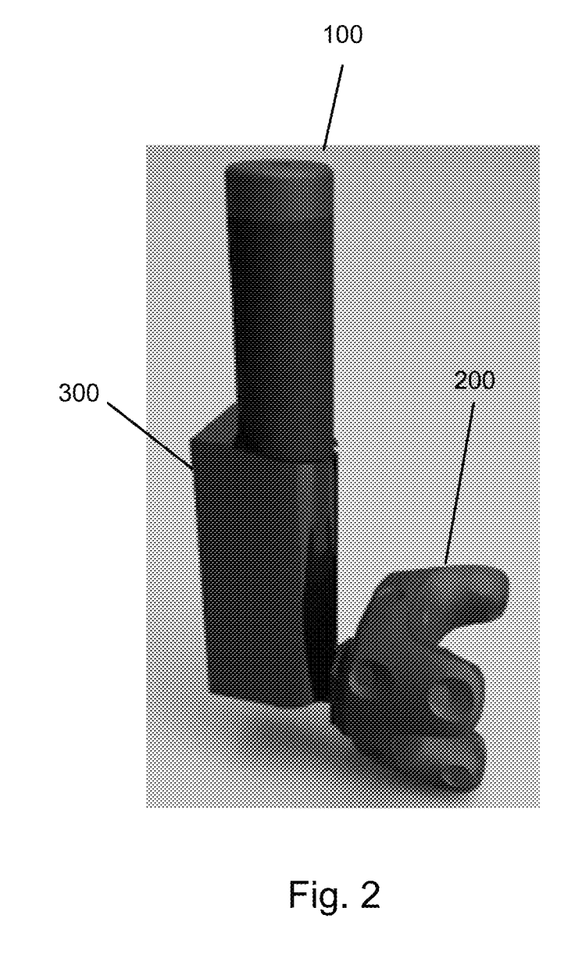
FIG. 2 illustrates a weapon accessory coupled to a tracker according to an embodiment of the present invention.

FIG. 2 presents a training device according to an embodiment of the present invention. The training device illustrated comprises weapon accessory 100 coupled to a tracker 200. Tracker 200 may comprise hardware configured to track and link actions, events or signals associated with weapon accessory 100 to a virtual reality computing device. Commands may be generated on tracker 200 and received and interpreted by the virtual reality computing device. According to one embodiment, the virtual reality computing device may comprise a server running a Unity engine (Unity Technologies) that is interfaced with the tracker 200 that includes hardware, software, and software development tools from virtual reality providers such as VIVE™.

Tracker 200 may further include image sensors and/or non-optical sensors (e.g., utilizing sound waves or magnetic fields) that can be installed in hardware to track the movement of a user's body. According to another embodiment, optical markers may be placed on tracker 200 (or alternatively on weapon accessory 100) for motion tracking using cameras to track movement of a user. Weapon accessory 100 is sheathed in a scabbard 300. A portion of the weapon accessory, such as the tracker adapter 104 and an adjacent portion of the baton 102 may be fitted into the scabbard 300. The scabbard 300 may allow tracker placement away from the hand location and enables drawing of the weapon accessory 100 from the scabbard 300 without tracker interference tracker 200.

Figure 3:
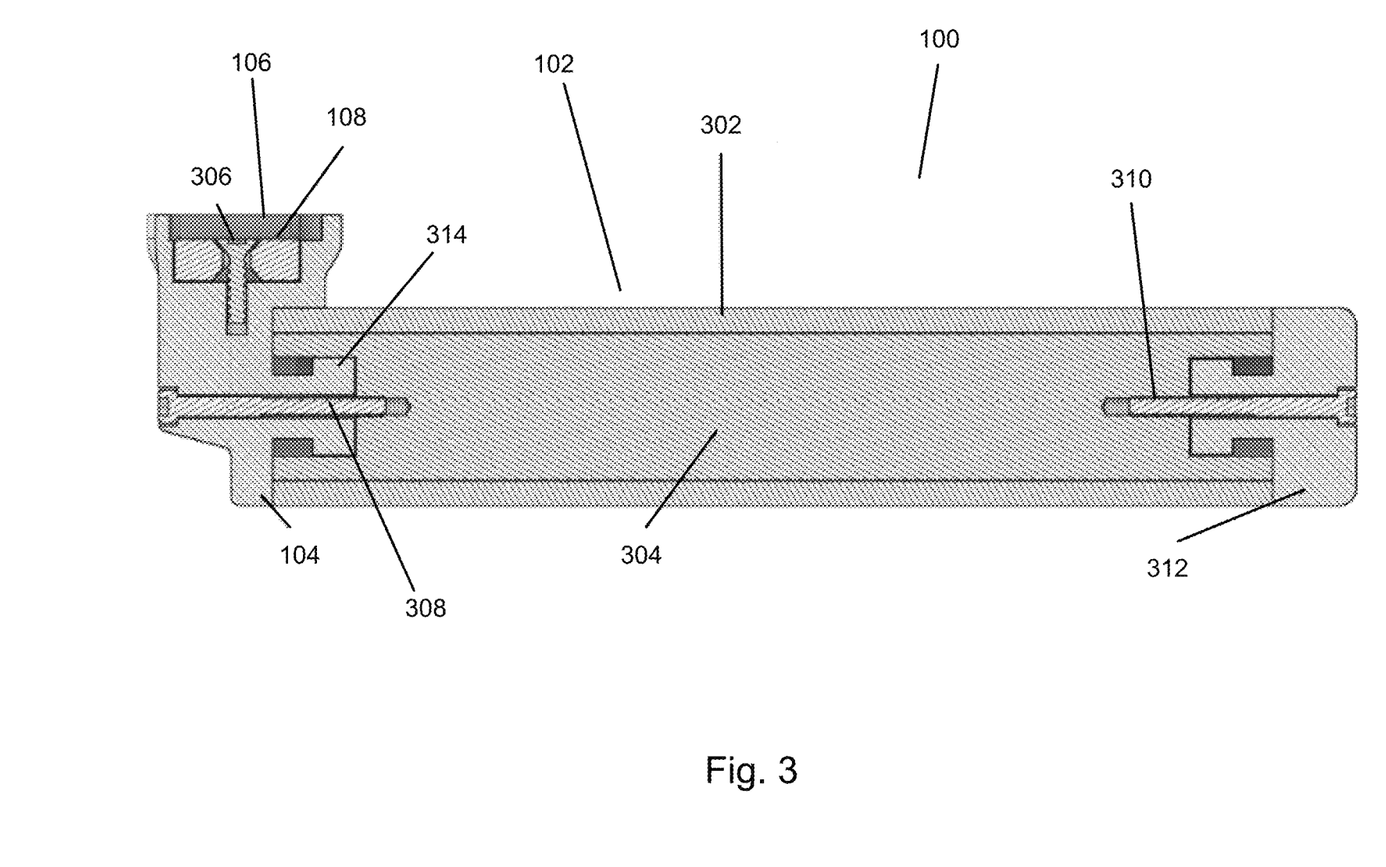
FIG. 3 illustrates a cross-section view of a weapon accessory according to an embodiment of the present invention.

FIG. 3 presents a cross-section view of a weapon accessory according to an embodiment of the present invention. Baton 102 comprises a center shaft 304 enclosed by a rubber grip 302. Tracker adapter 104 is attached to baton 102 by securing a stem 314 in a cavity of the center shaft 304 by a screw 308. Tracker adapter 104 may comprise hardware and circuitry for adapting a weapon to tracker 200 and facilitating communications between the baton 102 and a virtual reality computing device, wirelessly.

The tracker adapter 104 includes a groove 106 comprising a female socket including a magnet 108 that is secured in the groove 106 by screw 306. The groove 106 may be configured to receive, e.g., a metallic connector of tracker 200 by magnetic attraction of magnet 108. The tracker 200 may include a connector having a strike plate comprising ferromagnetic material, such as iron, cobalt, nickel, and alloys thereof. The tracker 200 can be attached to the tracker adapter 104 by inserting the strike plate into groove 106 which causes a magnetic attraction to magnet 108. Baton 102 may further include a bottom cap 312 that is secured to center shaft 304 by screw 310.

Figure 4:
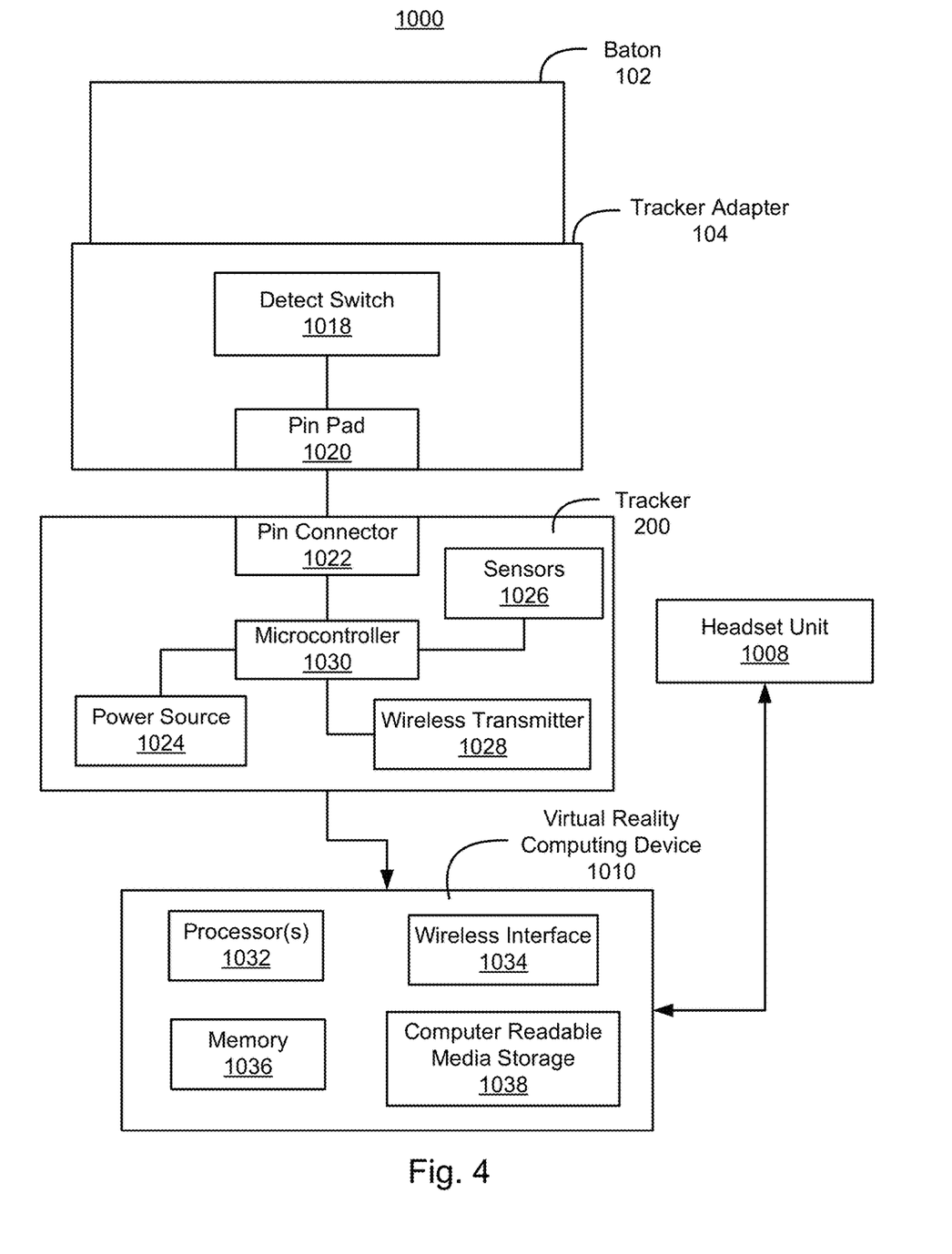
FIG. 4 illustrates a computing system according to an embodiment of the present invention.

FIG. 4 presents a computing system according to an embodiment of the present invention. A system 1000 may include baton 102, tracker adapter 104, tracker 200, headset unit 1008, and virtual reality computing device 1010. Baton 102 may comprise hardware and/or circuitry (not illustrated), such as an accelerometer, that are coupled to tracker adapter 104. Tracker adapter 104 includes a detect switch 1018 that may generate electrical signals that are associated with usage of baton 102 or a detachment of baton 102 and tracker adapter 104 from tracker 200. Detect switch 1018 may include a circuit component that opens and closes an electrical circuit to trigger signal outputs. The signal outputs may be transferred from detect switch 1018 to pin pad 1020.

Tracker adapter 104 may be further coupled to tracker 200. Tracker 200 includes pin connector 1022, power source 1024, sensors 1026, wireless transmitter 1028, and microcontroller 1030. Pin pad 1020 may be communicatively or electrically connected to pin connector 1022. Power source 1024 may be connected to microcontroller 1030 and used by microcontroller 1030 to provide a voltage source to components within tracker adapter 104 (and optionally baton 102) via pin connector 1022. As such, microcontroller 1030 may receive signals from pin connector 1022 and transmit the signals to virtual reality computing device 1010 via wireless transmitter 1028. Virtual reality computing device 1010 may process or render the signals using processor(s) 1032 and transmit corresponding images to headset unit 1008 from wireless interface 1034.

Microcontroller 1030 may also provide power to sensors 1026 and wireless transmitter 1028 from power source 1024. Sensors 1026 can detect a position of tracker 200 within the x, y and z coordinates of a space, as well as orientation including yaw, pitch and roll. From a user's perspective, a weapon accessory (e.g., baton 102 and tracker 104) connected to tracker 200 may be tracked when pointed up, down, left and right, tilted at an angle, or moved forward or backwards. Sensors 1026 may communicate where the weapon accessory is oriented to microcontroller 1030 which sends the data to virtual reality computing device 1010 for processing by processor(s) 1032 and renders corresponding images for transmission by wireless interface 1034 to headset unit 1008.

Headset unit 1008 may comprise a head mounted display, also including components similar to tracker 200, that a user can place over the user's eyes. The headset unit 1008 may be configured to communication with the virtual reality computing device 1010 to provide display according to a virtual reality simulation program. Additionally, the headset unit 1008 may be configured with positioning and/or motion sensors to provide user motion inputs to virtual reality computing device 1010. When wearing the headset unit 1008, the view may shift as the user looks up, down, left and right. The view may also change if the user tilts their head at an angle or move their head forward or backward without changing the angle of gaze. Sensors on headset unit 1008 may communicate to processor(s) 1032 where the user is looking, and the processor(s) 1032 may render corresponding images to the head mounted display. Sensors, as disclosed herein, can detect signals of any form, including electromagnetic signals, acoustic signals, optical signals and mechanical signals.

Virtual reality computing device 1010 includes processor(s) 1032, wireless interface 1034, memory 1036, and computer readable media storage 1038. Processor(s) 1032 may be configured to execute virtual reality training software stored within memory 1036 and/or computer readable media storage 1038, to communicate data to and from memory 1036, and to control operations of the virtual reality computing device 1010. The processor(s) 1032 may comprise central processing units, auxiliary processors among several processors, and graphics processing units. Memory 1036 may include any one or combination of volatile memory elements (e.g., random access memory (RAM). Computer readable media storage 1038 may comprise nonvolatile memory elements (e.g., read-only memory (ROM), hard drive, etc.). Wireless interface 1034 may comprise a network device operable to connect to a wireless computer network for facilitating communications and data transfer with tracker 200 and headset unit 1008.

The virtual reality training software may comprise an audio/visual interactive interface that enables a trainee to interact with a three-dimensional first-person-view environment in training scenarios with tracker devices, such as a virtual reality-enabled weapon accessory (e.g., comprising baton 102 and tracker adapter 104) attached to a tracker 200. Virtual reality computing device 1010 may receive signals or commands from tracker 200 and headset unit 1008 to generate corresponding data (including audio and video data) for depiction in the virtual reality environment. According to one embodiment, virtual reality computing device 1010 may recognize signals or commands associated with collapsible batons. Baton 102 may mimic collapsible batons that can be stored easily and extended when "flicked open" by the user. The virtual reality training software may detect when the user "flicks" the baton 102 and updates a virtual environment to show an extended baton. This may happen without any physical changes to baton 102. Detection of a flick motion with the baton may comprise a signal generated by baton 102, such by an accelerometer or circuit embedded therein, or a detection of a given motion of the baton 102 by the tracker 200.

Figure 5:
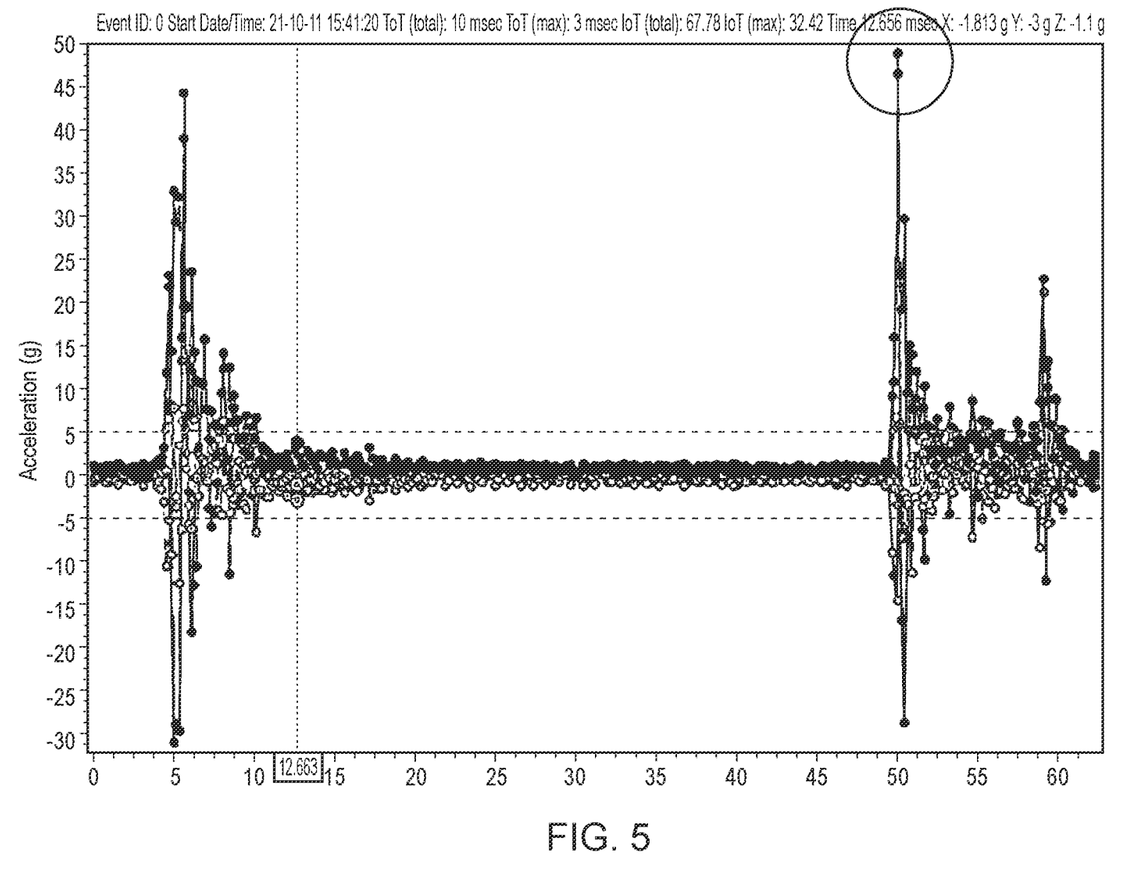
FIG. 5 illustrate exemplary failure analysis of swinging a weapon accessory according to an embodiment of the present invention.

FIG. 5 presents exemplary failure analysis of swinging a weapon accessory according to an embodiment of the present invention. The illustrated chart shows data from measurements of acceleration when swinging the disclosed weapon accessory to test for tracker adapter failure when swung. The measurements for producing this type of data may be taken by an accelerometer attached to a swinging arm holding the weapon accessory, or alternatively embedded within the weapon accessory itself. A 50G global acceleration load case is tested based on centripetal acceleration due to swinging. The load case in this data may be calculated based on the average speed of a baseball bat swing.

Figure 6:
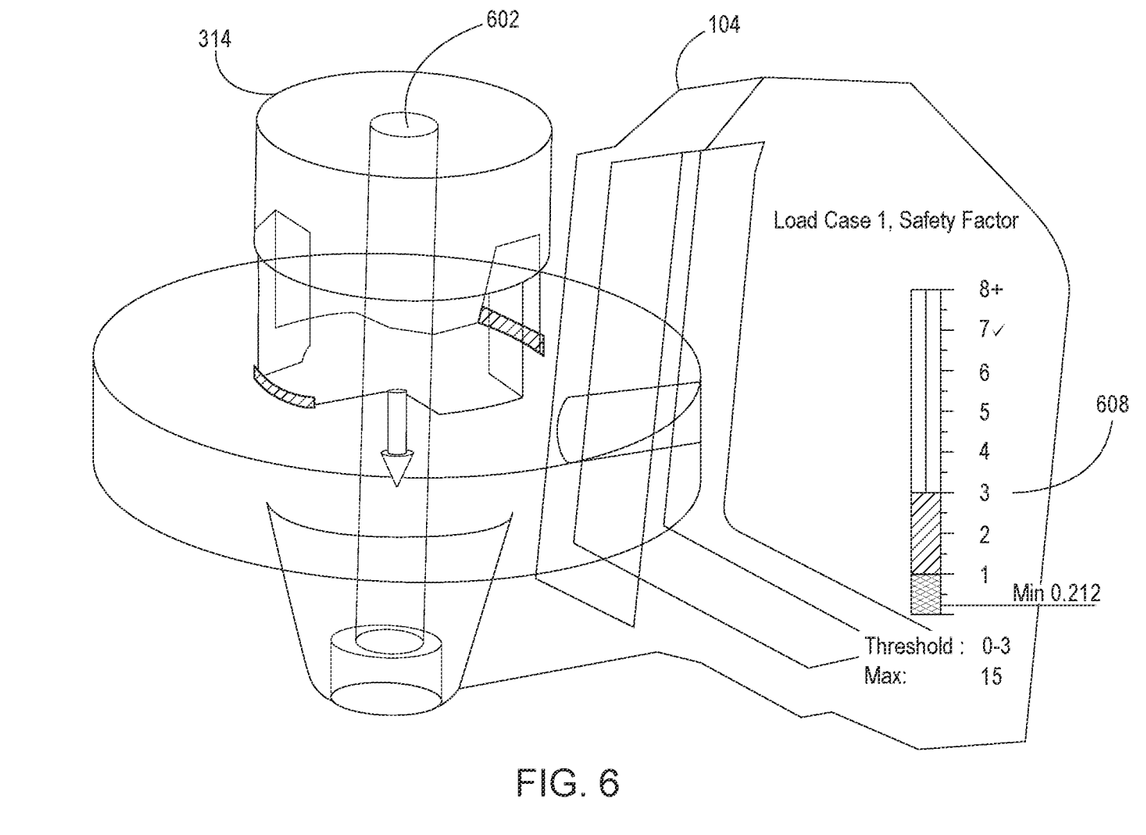
FIGS. 6 through 8 illustrate exemplary point of failure analysis of a tracker adapter according to an embodiment of the present invention.
Figure 7:
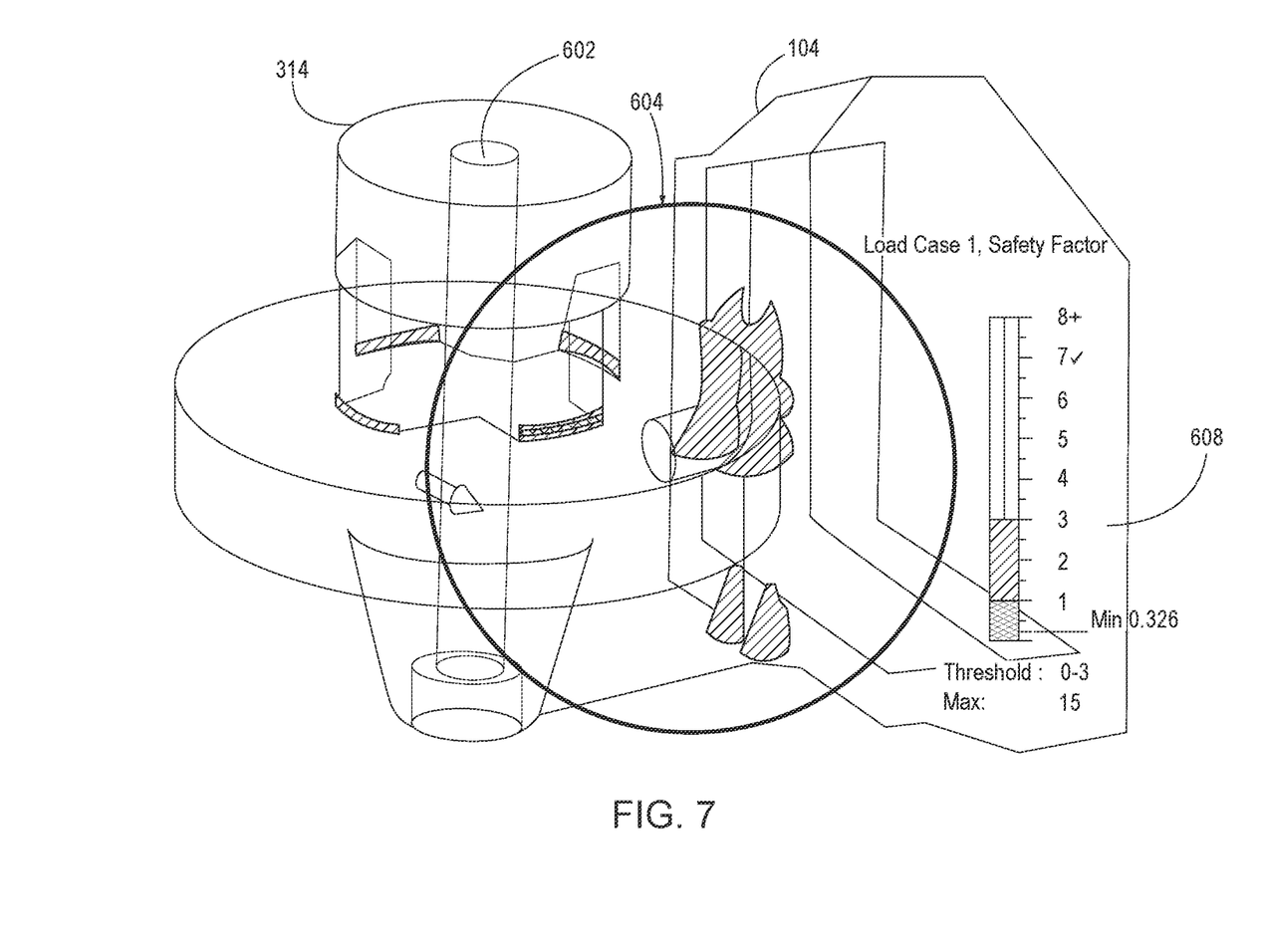
Figure 8:
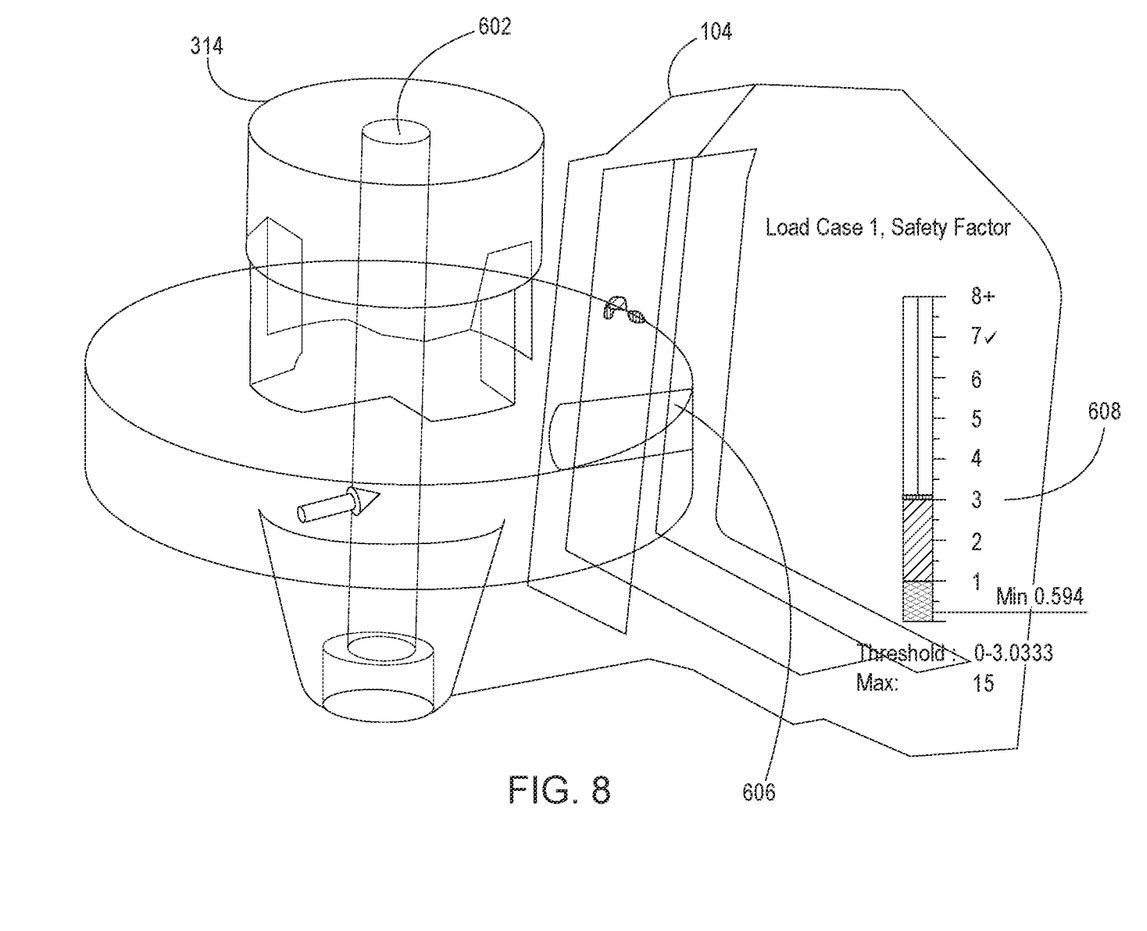

FIGS. 6 through 8 present exemplary point of failure analysis of a tracker adapter according to an embodiment of the present invention. A tracker adapter 104 may be analyzed for its durability by, for example, performing stress simulation in three axes (e.g., x, y, z) about screw hole 602 (for screw 308) of stem 314. A safety factor gauge 608 displays factor of safety rating data received from the various simulations. FIG. 6 shows stress testing by applying downward force at screw hole 602. FIG. 7 shows stress testing by applying a force perpendicular to screw hole 602 that stresses a neck 604 of the tracker adapter 104. FIG. 8 shows stress testing by applying a force perpendicular to screw hole 602 in a direction of the plane of screw hole 606 (for screw 306).

FIGS. 1 through 8 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A virtual reality weapon accessory comprising:
a baton;
a virtual reality tracker to communicate with a virtual reality computing device and comprising a strike plate and a pin connector; and
a tracker adapter fixed to the baton and removably coupled to the virtual reality tracker, the tracker adapter including:
a groove comprising a female socket configured to receive the strike plate of the virtual reality tracker, the groove including a magnet that attracts to the strike plate;
a pin pad configured to establish signal connections with the pin connector of the virtual reality tracker when the virtual reality tracker is coupled to the tracker adapter; and
a detect switch to send an electrical signal to the virtual reality tracker over the pin pad when the virtual reality tracker is coupled to the tracker adapter.

2. The virtual reality weapon accessory of claim 1 wherein the baton comprises a physical replica weapon portion of the weapon accessory.

3. The virtual reality weapon accessory of claim 2 wherein the physical replica weapon portion includes a realistic feel, grip, and weight of an actual baton.

4. The virtual reality weapon accessory of claim 1 wherein the baton is constructed from plastic, metal, or wood.

5. The virtual reality weapon accessory of claim 1 wherein the groove provides proper alignment and contact for receiving the virtual reality tracker.

6. The virtual reality weapon accessory of claim 1 further comprising a scabbard that sheathes at least the tracker adapter and a portion of the baton.

7. The virtual reality weapon accessory of claim 1 wherein the strike plate comprises a ferromagnetic material.

8. The virtual reality weapon accessory of claim 1 wherein the baton comprises a center shaft enclosed by a rubber grip.

9. The virtual reality weapon accessory of claim 8 wherein the tracker adapter includes a stem that is attached to a cavity of the center shaft.

10. The virtual reality weapon accessory of claim 1 wherein the baton comprises an accelerometer that is coupled to the tracker adapter.

11. The virtual reality weapon accessory of claim 1 wherein the detect switch generates signals that are associated with usage of the baton or a detachment of the tracker adapter from the virtual reality tracker.

12. The virtual reality weapon accessory of claim 1 wherein the virtual reality tracker is configured to detect a flick motion associated with the baton.

13. The virtual reality weapon accessory of claim 12 wherein the virtual reality computing device is configured to render a virtual environment that shows an extended baton corresponding to the flick motion.

* * * * *